(No Model.)
P. W. ANTHONY.
DITCHING MACHINE.
No. 512,085. Patented Jan. 2, 1894.
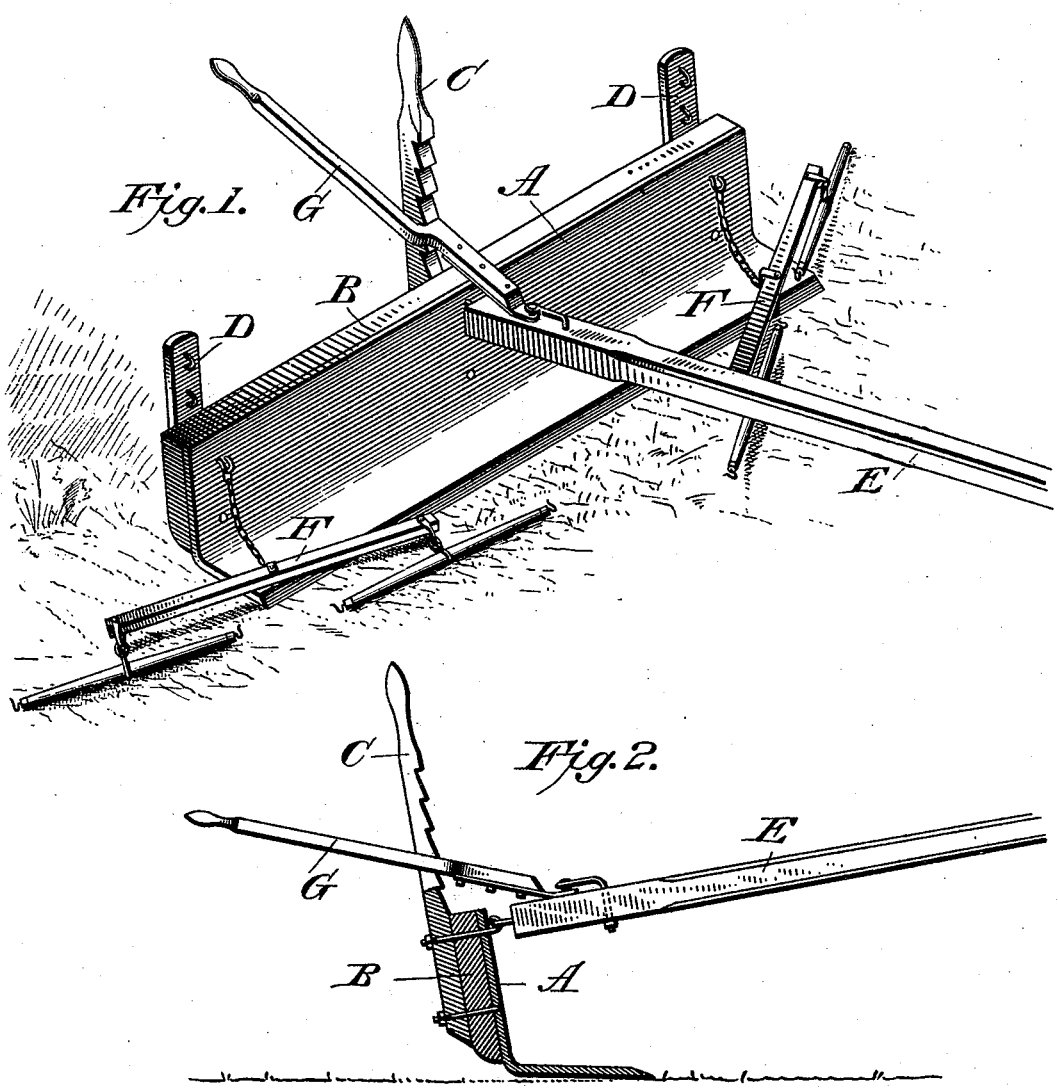
Witnesses
L. S. Elliott.
C. M. Johnson
Paul W. Anthony.
Inventor
by
Attorney
THE NATIONAL LITHOGRAPHING COMPANY,
WASHINGTON, D. C.

UNITED STATES PATENT OFFICE.

PAUL W. ANTHONY, OF FAIRMONT, MINNESOTA.

DITCHING-MACHINE.

SPECIFICATION forming part of Letters Patent No. 512,085, dated January 2, 1894.

Application filed July 28, 1893. Serial No. 481,783. (No model.)

*To all whom it may concern:*

Be it known that I, PAUL W. ANTHONY, a citizen of the United States of America, residing at Fairmont, in the county of Martin and State of Minnesota, have invented certain new and useful Improvements in Ditching-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the invention is to provide a cheap, simple and effective ditching machine which in making the ditch is used to remove the earth transversely with the length of the ditch instead of longitudinally as is common with the ordinary ditching machines.

The invention consists in providing an angular scraping blade with an upwardly projecting bar having ratchet-teeth on its forward edge with which a lever pivotally attached to the tongue is adapted to engage to set the cutter or scraping blade at the proper angle, the tongue being pivoted to the scraping blade in front of the ratchet-bar and the draft mechanism being connected to the scraping blade near the ends thereof; and the invention further consists in the construction and combination of the parts, as will be hereinafter fully set forth, and particularly pointed out in the claims.

In the accompanying drawings, forming part of this specification, Figure 1 is a perspective view showing a ditching machine constructed in accordance with my invention, and Fig. 2 is a sectional view.

A designates the cutting blade which is bent parallel with the cutting edge as shown, the angle of the bend being slightly greater than a right-angle. The cutting edge of the blade is beveled as shown. The rear or upwardly projecting portion of the cutting blade is reinforced by a backing, B, and the bolts which pass through the backing and cutting blade also secure in place the upwardly projecting bars C and D. The upper bolts are preferably eye-bolts, and to the eye-bolt at the center of the cutting blade is connected the tongue E, while to the eyebolts near the ends of the blade are connected the draft mechanism or whiffletrees F F. The whiffletrees can be readily detached from the eyebolts and connected to the upwardly projecting bars D D so as to change the position of the draft.

G designates a lever which is pivoted at its forward end to the tongue in advance of the point where said tongue is pivoted to the blade A. This lever extends rearwardly and is provided with an offset which is adapted to engage with the ratchet-teeth of the bar C.

The tongue and draft mechanism extend a considerable distance in advance of the cutter, and the tongue is connected to the horses or draft animals so that the draft will not come on said tongue but said tongue merely serve as a fulcrum for holding the cutting-blade at the angle at which it may be desired to adjust the same, which adjustment may be varied by the different positions of the lever G to cause the cutting-blade to enter the ground at the desired angle—either to make a deep or a shallow cut.

In operation the cutting blade or edge of the same is arranged cross-wise of the ditch to be cut and the lever is set so that the machine when drawn across the ditch will loosen the dirt and carry it to the opposite embankment, and by moving the lever G to one side the draft on the machine or implement will cause the same to dump its load, when the machine can be turned and the operation repeated.

Having thus described my invention, what I claim as new, and desire to secure by Letters Patent, is—

1. In a ditching-machine, the combination, of a cutting-blade having a tongue pivotally attached to the center part thereof, bars D D secured to the cutting blade near the ends of the same and provided with means for connecting the draft mechanism thereto, a bar C secured to the center part of the cutting blade and provided with ratchet-teeth on its front edge, and a lever G pivotally attached to the rear end of the tongue for engagement with the teeth of the ratchet-bar C, the handle of the lever extending beyond the ratchet-bar, substantially as shown, and for the purpose set forth.

2. A ditching-machine comprising a bent scraper blade A, draft mechanism attached to said blade near its ends, a tongue pivoted to the center part of the scraper blade, a reinforcing piece B, a ratchet-bar C and a lever G pivoted to the tongue and provided with an offset for engagement with the ratchet-bar, the parts being organized substantially as shown, and for the purpose set forth.

In testimony whereof I affix my signature in presence of two witnesses.

PAUL W. ANTHONY.

Witnesses:
B. F. VOREIS,
R. P. RAY.